(No Model.)

P. ADIE, Dec'd.
W. G. HENDERSON, Administrator.
DRIVING BELT AND WHEEL.

No. 376,975. Patented Jan. 24, 1888.

Attest:
John A. Ellis.
Rena Dolson

Inventor:
Patrick Adie.
By David A. Burr.
Atty.

United States Patent Office.

PATRICK ADIE, OF LONDON, COUNTY OF MIDDLESEX, ENGLAND; WILLIAM G. HENDERSON, OF WASHINGTON, DISTRICT OF COLUMBIA, ADMINISTRATOR OF SAID PATRICK ADIE, DECEASED.

DRIVING-BELT AND WHEEL.

SPECIFICATION forming part of Letters Patent No. 376,975, dated January 24, 1888.

Application filed January 23, 1886. Serial No. 189,475. (No model.) Patented in England June 1, 1885, No. 6,442; in France August 17, 1885, No. 170,671, and in Belgium August 19, 1885, No. 69,927.

*To all whom it may concern:*

Be it known that I, PATRICK ADIE, of Broadway, Westminster, in the city of London, England, have invented a new and useful Improvement in the Construction of Driving-Belts and the Wheels to which they are Applied, (for which I have filed a provisional specification in England, No. 6,442, dated June 1, 1885, and obtained Letters Patent in Belgium, No. 69,927, dated August 19, 1885, and in France, No. 170,671, dated August 17, 1885;) and I do hereby declare that the following is a full and exact description thereof, reference being had to the accompanying drawings, and to the letters of reference marked thereon, making a part of this specification.

My invention relates to an improvement in gearing for transmitting power, and has for its object to combine with the positive action and movement of toothed gear all the advantages incident to the use of frictional driving belts or chains, with an entire freedom at all times from the undue strain upon the bearings occasioned by the tightening up of the ordinary flexible belts operating by friction alone. This object is attained in my invention by the use of a belt formed of thin sheet metal, preferably steel, corrugated transversely to present a uniform series of curved projections and intermediate depressions, (so that the edges of of the belt describe a continuous succession of short reversed curves or undulations,) in combination with a pulley having counterpart projections and depressions formed continuously about the periphery thereof, parallel with its axis, so as to present a continuous succession of curved recesses adapted to receive and engage the curved projections of the belt, all as hereinafter more fully described.

The belt of corrugated metal may have a plain strip of thin steel or other flexible material attached to one side thereof, thereby imparting additional tensile strength to the belt; or the belt may be formed of several superimposed thicknesses or layers uniformly corrugated.

Figure 1:
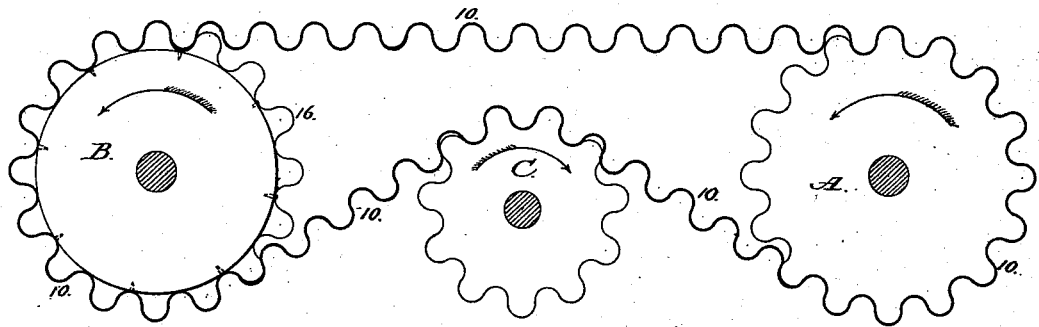
Figure 2:

Figure 1 of the accompanying drawings is a side elevation of my improved corrugated metallic driving-belt, in combination with the corrugated pulleys made to engage it, and it illustrates its application for driving a wheel, B, from a main wheel, A, so that the two shall revolve in the same direction, and also for driving a wheel, C, from said main wheel, so that the two shall revolve in opposite directions. Figs. 2, 3, 4, and 5 illustrate various modifications in the construction of the belt.

10 in said drawings represents the improved belt made of a single strip of transversely-corrugated metal in the form adapted for use when the power to be transmitted thereby is moderate. The transverse corrugations in the strip are made to follow each other uniformly and continuously in the entire length of the belt, and are so formed as to present, in transverse section taken longitudinally through the belt, a succession of equal reverse curves each of a semicircular form.

A B C represent the form of wheels required for use with the belt. These wheels or pulleys are constructed with transversely grooved or corrugated peripheries the curves of whose projections and depressions present, in transverse section taken in a plane at a right angle to the axis of the wheel, semicircular curves of a radius approximating closely to or corresponding with the radii of the curves in the belt 10 to be applied to the wheel, so that the belt shall fit accurately upon the wheel to engage the same closely and evenly.

Figure 3:
Figure 4:
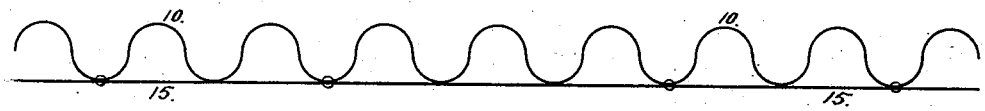
Figure 5:
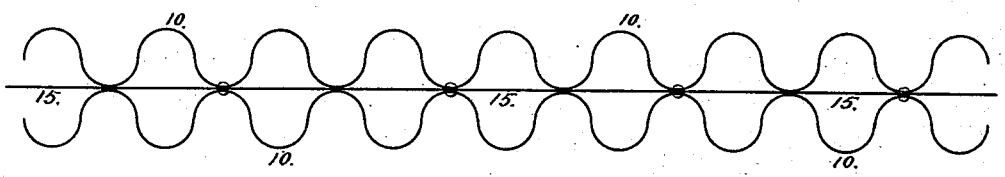

When the wheels connected by the belt are to revolve in the same direction, the corrugated belt 10 may be re-enforced by a plain flexible strip, 15, riveted to it at intervals, as shown in Fig. 4, so as to span as a chord the several arcs formed by the curves in the belt; or, for use with wheels to be driven in opposite directions, as B and C in Fig. 1, from a single motor, A, the belt may be constructed of two flexible corrugated strips, 10 10, combined with an intermediate plain straight strip, 15, as shown in Fig. 5. For transmitting great power several similar thin corrugated strips, 11 12 13, may be superimposed and riveted together to form a compound belt, as shown in Fig. 3.

The transversely-grooved wheels for use with my improved corrugated steel belting may have their projections or transverse corrugations either solid and integral with them or made separately and affixed to them as toothed or mortise wheels are usually made, (see at A and C, Fig. 1,) or they may have strips 16 of corrugated belt fastened on their peripheries, as indicated with respect to B in Fig. 1.

My improved corrugated steel belting supplies, through its form, the required flexibility and elasticity demanded in a good belt, together with the durability and strength of well-tempered steel. In operation it saves, statically, over one-half or nearly two-thirds of the power at present employed in all belted machinery. For example, in a machine-shop the driving-belt must be tight enough to drive all the other belts, and these in their turn must be tight enough each to drive its respective machine and take its cut without slipping, whereas with the steel corrugated belting these two enormous sets of friction are virtually got rid of, the steel belt being loose and acting by the nearly square pull on the teeth at the periphery as it comes off the pulley.

I claim as my invention—

1. The combination, with a metallic driving-belt formed with an uninterrupted succession of transverse corrugations to present in longitudinal section an unbroken series of reversed curves substantially semicircular in form, of a wheel or pulley having a counterpart transversely grooved or corrugated periphery adapted to engage said belt, substantially in the manner and for the purpose herein set forth.

2. A driving-belt constructed of a thin metallic strip having an uninterrupted succession of uniform transverse semicircular bends or corrugations, presenting in longitudinal section an unbroken series of reversed curves, in combination with a plain straight metallic strip superimposed and secured longitudinally thereon, to serve as a continuous chord for the several arcs of said curves, substantially in the manner and for the purpose herein set forth.

3. The combination of the pulley, a corrugated band of metal applied to the pulley, and the corrugated belt fitting to the said pulley, substantially as described.

In testimony whereof I have signed my name to this specification in the presence of two subscribing witnesses.

PATRICK ADIE.

Witnesses:
CHAS. ROCHE,
JAMES BRISTOW.